United States Patent

Harvey

[11] 4,324,469
[45] Apr. 13, 1982

[54] CAMERA ADAPTED TO FACILIATE REMOVAL AND REUSE OF PARTIALLY EXPOSED FILM CASSETTES

[75] Inventor: Donald M. Harvey, Webster, N.Y.

[73] Assignee: Eastman Kodak Company, Rochester, N.Y.

[21] Appl. No.: 166,939

[22] Filed: Jul. 8, 1980

[51] Int. Cl.³ .......................... G03B 1/00; G03B 1/60
[52] U.S. Cl. .................................... 354/214; 354/173
[58] Field of Search .............. 354/173, 214, 215, 217, 354/170, 171

[56] References Cited

U.S. PATENT DOCUMENTS

| | | | |
|---|---|---|---|
| 2,591,417 | 4/1952 | Frye | 354/214 X |
| 2,969,722 | 1/1961 | Schwartz | 354/173 |
| 4,034,393 | 7/1977 | Goldmacher | 354/214 X |
| 4,171,893 | 10/1979 | Kawazoe | 354/173 |

*Primary Examiner*—John Gonzales
*Attorney, Agent, or Firm*—A. B. Pagel

[57] ABSTRACT

A generally conventional still camera having an exposure counter and adapted to use rewindable cassette loaded film, e.g. a 35 mm camera, includes a selector member movable to an "automatic rewind" position, a "mid-roll rewind" position and a "counter-reset" position. When the selector is in its automatic rewind position, the film is automatically rewound entirely into the cassette after all of the available exposures have been made, as is well known in the prior art. When the selector is moved to the mid-roll rewind position, a partially exposed roll of film is rewound into the cassette, leaving its leader portion extending from the cassette and the film counter continues to display the number of the last unexposed film frame. Preferably, a signal is also displayed in the viewfinder to alert the photographer to the fact that the camera has been adjusted to this mode of rewinding operation. Consequently, the photographer does not lose the opportunity to read and record the number of the next available exposure on the partially exposed film that he has removed from the camera and he is reminded to do so by the signal. After he has recorded that number, the counter is reset manually by means of the selector member in preparation for the next cassette. If the selector member is held in its counter reset position, the film advances continuously while the counter performs in its conventional manner. Thus, after the partially exposed film cassette is reinstalled in the camera, the photographer can advance it to the next available exposure frame by holding the selector member in its counter-reset position until the corresponding number is displayed by the counter.

4 Claims, 1 Drawing Figure

CAMERA ADAPTED TO FACILIATE REMOVAL AND REUSE OF PARTIALLY EXPOSED FILM CASSETTES

BACKGROUND OF THE INVENTION

1. Field of the Invention

The present invention relates to cassette loaded cameras of the 35 mm type and more particularly to providing such cameras with means for facilitating the removal and subsequent replacement of cassettes holding partially exposed film.

2. Brief Description of the Prior Art

If a photographer, using a conventional 35 mm camera, removes a partially exposed film cassette to replace it with another cassette containing a different type of film, he encounters a number of problems when he later wishes to expose the rest of the film in the former cassette.

When the photographer rewinds the partially exposed film, he must be certain that the exposed portion is fully received in the cassette to protect it from light, but at the same time he must be careful to leave the leader portion of the film extending out of the cassette so that he can later re-attach it to the film takeup spool in the camera. Some 35 mm cameras with electrically powered rewind mechanisms leave the leader of the rewound film extending out of the cassette, but with most relatively inexpensive 35 mm cameras, the photographer must tactily or audibly sense the separation of the film from the takeup spool, which requires considerable experience and skill.

Assuming that he successfuly performed the rewinding operation, the photographer then opens the camera door to remove the cassette with the partially exposed film. With most cameras, the opening of the door automatically resets the film counter in preparation for the installation of the next cassette. Therefore, if the photographer forgets to observe the counter before opening the door, he can no longer determine how many film frames were exposed and therefore must guess the frame number if he later re-installs the cassette to expose the remaining film. Finally, if he successfully surmounts the foregoing difficulties and reloads the partially exposed cassette in the camera, the photographer now must return the film to the next available exposure frame. This requires him alternately to advance the film and release the shutter with the lens cap in place, until the counter indicates that the film has been advanced to its previous condition.

Previously, various arrangements have been proposed to facilitate the removal and subsequent replacement of a partially exposed strip of film in a camera. For example, U.S. Pat. No. 4,034,393 discloses providing a cassette-loaded filmstrip with a tab that prevents the leader end of the strip from being rewound into the cassette and with a label that serves both to simplify recording the number of exposures previously made on the film and also to facilitate properly re-aligning the film's sprocket holes with the camera's metering mechanism when the film is subsequently re-loaded into the camera. The film counter disclosed in that reference automatically resets when the camera's door is opened, and therefore does not avoid the previously-mentioned problems caused by the failure of the photographer to make a timely notation of the number of exposures that have been made on the partially exposed filmstrip.

Another such arrangement, which is directed entirely to the camera rather than to modifications of the film or its cassette, is disclosed in U.S. Pat. No. 3,511,153. In accordance with this reference, a film counting mechanism always begins its operation with the same tooth of its film metering sprocket in initial engagement with the same sprocket hole of any filmstrip, thus assuring exact registration of exposed frames after reloading of the cartridge. The exposure counter is reset either manually or automatically, but no provision is made for automatically preserving the counter reading when partially exposed film is removed, while also insuring that the counter is reset properly when a new unexposed film cassette is loaded into the camera. It should be noted that although some cameras have counters that must be manually reset and which thereby inherently preserve the last exposure identification, for example the camera shown in U.S. Pat. No. 2,591,417, the advantage that such a counter may afford in removing and subsequently replacing partially exposed film is offset by the likelihood that the photographer will forget to reset the counter when a new film cassette is loaded into the camera. The latter is obviously a much more common occurrence than the removal and subsequent re-loading of partially exposed film.

Another approach to facilitating removal and subsequent re-loading of partially exposed film involves loading the film cassette (or a spool of paper backed roll film) into an auxiliary container or magazine that is removable from the camera without exposing the film to light and that includes its own exposure counter, which preserves its reading whenever the auxiliary container or magazine is removed from the camera. Cameras incorporating this type of construction are shown, for example, in U.S. Pat. Nos. 2,469,008; 2,927,518; 3,006,261; 3,474,714; 3,443,501; and 3,805,277. Cameras of this type indeed minimize the specific problems previously discussed, but this type of camera has not become popular among amateur photographers, presumably because of the expense and bulkiness of the auxiliary film containers or magazines and the resulting increase in the size, weight, and cost of the complete camera.

SUMMARY OF THE INVENTION

The present invention facilitates the removal and reuse of partially exposed film by providing a camera of the general type described above with a film advancing and rewinding mechanism that is selectively adjustable to two different modes of operation; namely, an "automatic" mode, a "mid-roll rewind" mode, and a "counter reset" mode. When adjusted to its "automatic" mode, the camera automatically rewinds the filmstrip completely into the cassette when the exposure counter indicates that all of the available exposures have been made, and the film counter is automatically reset to its initial condition prior to exposure of another film cassette. When the camera is adjusted manually to its "mid-roll rewind" mode of operation, all of the image-receiving portion of the film is rewound into the cassette but the rewind mechanism stops automatically to leave at least part of the film leader portion extending out of the cassette so that the latter subsequently can be reloaded into the camera. Also, whenever the camera is adjusted to its mid-roll rewind mode of operation, the exposure number displayed at the time of that adjustment preferably is preserved until the exposure counter is manually reset to its initial condition; thus giving the photographer several opportunities to observe and record the number of exposures still available on that film strip. Preferably, means are provided to alert the photographer to the fact that the camera is adjusted to its mid-roll rewind mode of operation and to prevent him from accidently exposing film in a subsequently loaded cassette without first having reset the camera mechanism to its automatic operating mode. Additionally, in the counter-reset mode of operation, the mechanism preferably can be employed to advance the film of a reloaded cassette to the next available exposure area without requiring manipulation of the camera shutter.

Various means for practicing the invention and other advantages and features thereof will be apparent from the following detailed description of an illustrative preferred embodiment of the invention, reference being made to accompanying drawings.

DESCRIPTION OF THE ILLUSTRATIVE PREFERRED EMBODIMENTS

Figure 1:
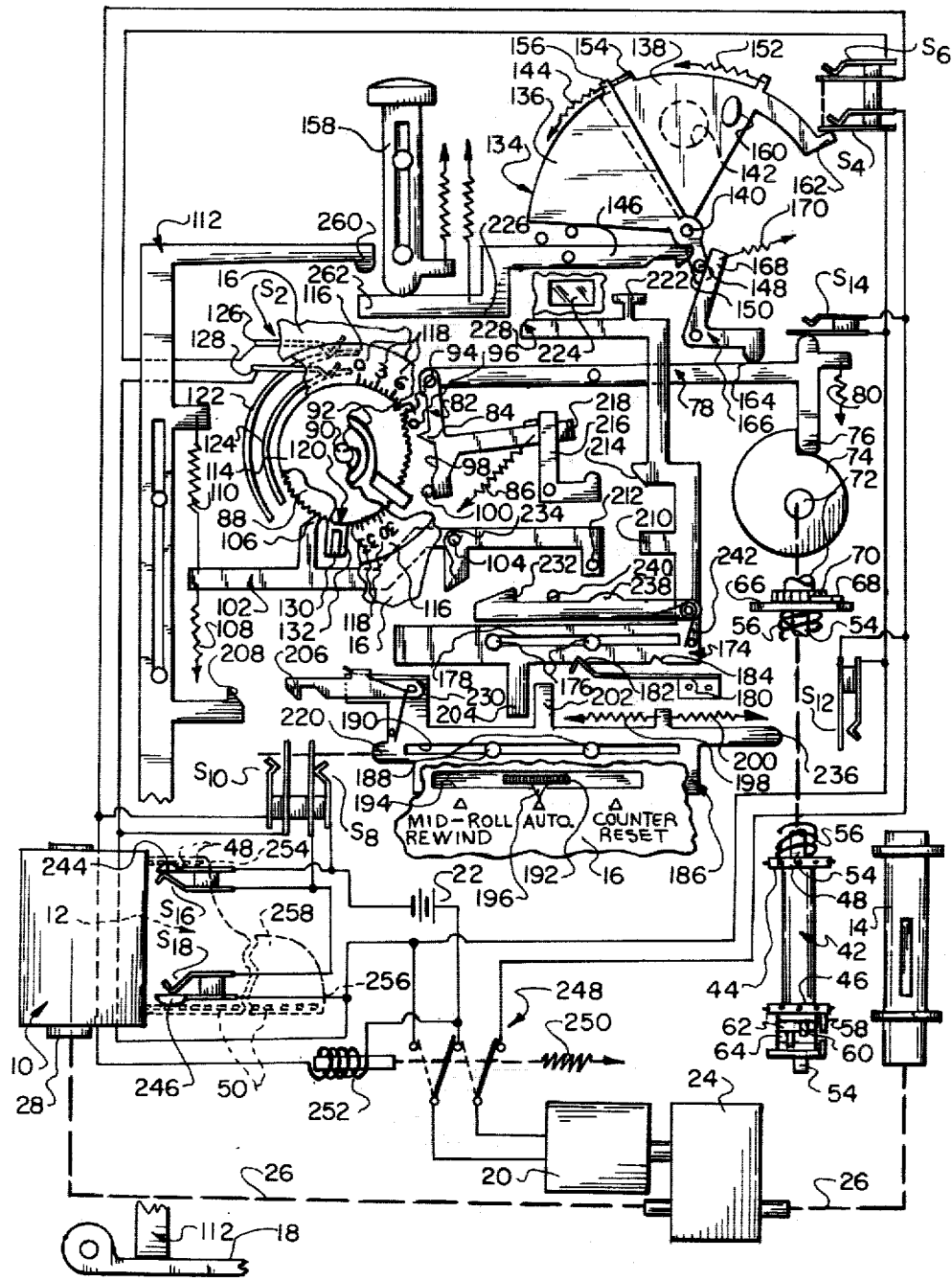
FIG. 1 is a schematic diagram illustrating the mechanical and electromechanical components of the camera structure according to a preferred embodiment of the present invention.

The camera structure depicted in FIG. 1 is appropriate for use in a typical 35 mm camera. Details of such a camera which are not germane to understanding the present invention have been omitted for purposes of clarity and brevity.

A 35 mm cassette 10, or the equivalent, is received in a film supply chamber, not shown, and the leading end of its film strip 12 is attached to a take-up spool 14, permanently mounted in a corresponding take-up chamber in the camera housing portions of which are shown at numeral 16. A cover door, partially shown at numeral 18, provides access to the film supply and take-up chambers, as is conventional in such cameras. A reversible electric motor 20 is powered by a battery 22 and is provided with a transmission mechanism represented at numeral 24, which is connected, as shown schematically by broken lines 26, to the film supply spool 28 in the film cassette and to the film take-up spool 14. The transmission mechanism is responsive to the direction of rotation of the motor so that whatever the motor is rotating in a film advancing direction, the take-up spool is driven in a film winding direction and the film cassette spool is disengaged from the motor. Similarly, whenever the motor runs in the opposite direction, the take-up spool is disengaged and the cassette spool is driven by the motor to rewind film into the cassette. Details of the transmission mechanism 18 have been omitted because such mechanisms are known in the prior art. Examples of analogous transmission mechanisms ae disclosed, for example, in U.S. Pat. Nos. 3,528,628 and 2,624,214, issued respectively on Sept. 15, 1970 and Jan. 6, 1953. Adjacent the take-up spool, the camera includes a sprocket spool 42 provided with sprocket wheels 44 and 46 that mesh with the respective upper and lowers rows of perforations 48 and 50 in the filmstrip. As is well known in the prior art, the number of teeth on each of the sprocket wheels corresponds to the number of sprocket perforations representing the film advancement necessary to bring successive exposure areas into exposure position. In other words, each successive advancement of the film to bring the next exposure area into exposure position causes the sprocket spool to make a complete single rotation in a counterclockwise direction, as viewed from the top in FIG. 1.

The sprocket spool 42 is rotatable on shaft 54, which in turn is rotatable in the camera housing. A spring 56 biases the sprocket spool in a clockwise direction relative to shaft 54. At the lower end of the spool, a pin 58 thereon is aligned with a finger 60 of a washer 62. The bent-down end of the finger, in turn, is similarly aligned with a corresponding finger on a similar washer 64, etc. Several of these stacked washers are provided, the lower-most one being affixed to shaft 54 and the others being freely rotatable; thus providing several rotations of lost motion between sprocket spool 42 and shaft 54. Whenever the film is removed from the camera, spring 56 rotates the sprocket spool in a clockwise direction relative to shaft 54 to absorb the available lost motion provided by the stack of washers. An example of the use of analogous washers to provide rotational lost motion is shown in U.S. Pat. No. 3,137,457 issued to D. E. Beach on June 16, 1964.

The top end of shaft 54 carries a clutch disk 66 provided with a spring loaded pawl 68 engageable with toothed wheel 70 on cam shaft 72, which is coaxial with shaft 54, whereby counterclockwise rotation of shaft 54 drives cam shaft 72 in the same direction but clockwise rotation of shaft 54 does not drive the cam shaft.

A cam 74, mounted at the top of cam shaft 72 is engaged by nose 76 of pivotable counter lever 78, which is biased by a spring 80 to retain nose 76 in contact with the cam. The cam 74 is shown in top view while the cam shaft 72 and its associated parts are shown in side view, but it should be understood that such schematic liberties have been taken with regard to various elements for illustrative purposes. The end of lever 78, opposite nose 76 pivotally carries an advancing pawl 82, the tooth 84 of which is urged by spring 86 toward ratchet wheel 88, mounted to rotatable shaft 90. A spring 92 biases shaft 90 in a clockwise direction toward the position at which ratchet wheel ear 94 is engaged with stop pin 96. When advancing film causes sprocket spool 42 to rotate cam 74 in a counterclockwise direction from its depicted position, pawl 82 first moves rearwardly, i.e. downwardly in FIG. 1. This movement brings pawl notch 98 into alignment with pin 100 and allows tooth 84 to engage and ratchet past the ratchet wheel. Continuing rotation of cam 74 then moves the pawl forwardly, so that tooth 84 advances the ratchet wheel in a counterclockwise direction through an angle equal to the width of one ratchet wheel tooth, whereupon pawl tooth 84 is withdrawn from the ratchet wheel as notch 98 moves beyond pin 100. Each time a complete rotation of the sprocket spool rotates cam 74 counterclockwise through a complete rotation from its depicted position, the resulting reciprocation of pawl 82 advances ratchet wheel 88 in a counterclockwise direction through an angle corresponding to the width of one of its teeth. An anti-reverse pawl lever 102, pivoted at 104, has a tooth 106 that also engages ratchet wheel 88 to prevent the latter from being rotated in a clockwise direction by pawl 82 during the counterclockwise movement of the counter lever. A spring 108 biases the anti-reverse pawl in a counterclockwise direction, to move its tooth 106 away from the ratchet wheel, but this spring is opposed by a stronger spring 110 connecting the same end of the anti-reverse pawl to slide 112. This slide is engageable by the camera's loading door 18, and is held in its depicted position by the door when the latter is closed; whereby spring 110 biases pawl tooth 106 into contact with ratchet wheel 88. Whenever the door is open, however, spring 108 holds tooth 106 out of contact with ratchet wheel 88, thereby allowing spring 92 to rotate that wheel in a clockwise direction to return ear 94 into engagement with stop pin 96.

At its top end, shaft 90 carries an indicator disk 114 that is visible from the exterior of the camera. This disk is surrounded by a numeral ring 116 that is provided with numeral indicia 118 and frictionally supported by the camera housing wall 16 so that it can be manually rotated. When the camera is loaded and the first exposure area has been moved into exposure position, as described later, the ring is rotated manually to align the numeral or numeral mark corresponding to the total number of available exposures with arrow 120 on the indicator disk, which is then advanced one tooth from the position defined by the engagement of ratchet wheel ear 94 with stop pin 96. In the drawing, which depicts the ratchet wheel in this position, the numeral ring is shown adjusted for 36 total exposures and the arrow 120 is in the position at which it points to the numeral 36, not shown. Thereafter, each successive advancement of the film to the next exposure position causes arrow 120 to move into alignment with the next smaller numeral indicium on ring 116, whereby the number indicated by the arrow identifies the number of available exposures remaining on the filmstrip.

As shown partially in broken lines, the lower face of numeral ring 116 is provided with two arcuate commutator strips 122 and 124 that are engaged by respective stationary brush contacts 126 and 128. A brush member 130 carried by an ear 132 attached to the lower face of disk 114 is adapted to bridge strips 122 and 124 to provide a normally open switch S2 that is closed when the movement of the disk has brought the arrow into alignment with the mark 1 on the ring; i.e., when the last available exposure region has been moved into exposure position but before that exposure region has been exposed.

A representative shutter 134 comprises an opening blade 136 and a closing blade 138, both pivoted at numeral 140, and is depicted in its uncocked position in which the closing blade covers the lens aperture 142. When the shutter is cocked, i.e. when both blades are rotated about 60° in a clockwise direction from their depicted positions, the opening blade is held in its cocked position in opposition to its spring 144 by a pivotable latch lever 146 engaged with pin 148 on opening blade ear 150; and the closing blade is held in its cocked position in opposition to its spring 152 by the engagement of its ear 154 with tongue 156 of the opening blade. When the latter blade is released by depression of shutter releasing slide 158, the opening blade immediately moves to its illustrated position, but the corresponding movement of the closing blade is delayed by its inertia, increased by weight 160; thus providing a momentary exposure during the interval between the movement of the opening blade out of alignment with the aperture and the movement of the closing blade into alignment with the aperture. As is well known in the prior art, the closing blade's movement can be retarded or delayed by an electro-magnet responsive to a light measuring circuit to automatically vary the shutter speed as a function of scene luminance. When the shutter has completed its operation, but before it has been recocked, ear 162 on the closing blade closes normally open switches S4 and S6, for purposes described later.

During the next film advance operation nose 164 of pivotal cocking lever 166 engages counter lever 78 and is thereby reciprocated by the complete rotation of cam 74, so that cocking lever finger 168 engages ear pin 148 on opening blade 136 and moves both blades, in unison, back to their respective cocked positions; whereupon the completion of the single rotation of cam 74 allows spring 170 to move cocking lever 138 back to its depicted position, out of the movement path of shutter ear 134.

A latch slide 174 is slidably supported by rivets 176 extending through slot 178 and is movable to the left from its illustrated central or "automatic" position to a "mid-roll rewind" position. Detent means, represented by detent spring 180 and detent notches 182 and 184, resiliently maintain the latch slide in either its central position or in its mid-roll rewind position.

An adjusting slide 186, supported by pins 188 extending through slot 190, includes a slide button 192 accessible from the exterior of the camera through slot 194 in the camera housing wall 16. A pointer 196 on the slide button indicates the adjustment status of the camera mechanism by pointing to the corresponding indicium on the housing wall adjacent slot 190. A pair of opposed springs 198 and 200 normally maintain slide 186 in its illustrated central position. When the adjusting slide is moved to the mid-roll rewind position, its tongue 202 engages tongue 204 of the latch slide and moves the latter to its corresponding mid-roll rewind position and spring-loaded latch dog 206 on the adjusting slide engages latch tooth 208 on slide 112 to maintain both the adjusting slide and the latch slide in those respective positions. In that position, latch slide hook 210 engages anti-reverse pawl pin 212 to maintain pawl tooth 106 in engagement with ratchet wheel 88; and latch slide cam edge 214 rotates pivotable disabling lever 216 in a clockwise direction, thereby causing it to engage ear 218 of advancing pawl 82 to hold the latter out of engagement with the ratchet wheel. Simultaneously, nose 220 of the adjusting slide opens normally closed switch S8 and closes normally open switch S10. Additionally, whenever the latch slide is in its mid-roll rewind position, a signal flag 222, carried by that slide, is moved into the field of view of the viewfinder, depicted at numeral 224, and the shutter release slide 158 is blocked by the engagement of latch lever edge 226 with latch slide extension 228. When the camera door is subsequently opened, slide 112 is moved rearwardly by spring 110 and latch tooth 208 moves out of engagement with latch dog 206, whereupon the adjusting slide is returned to its central position by spring 200 while the latch slide remains detented in its mid-roll rewind position.

When the adjusting slide is moved manually from its central position toward its counter-reset position, its edge surface 230 engages tongue 204 of the latch slide and moves the latter back to its central position. During the initial movement of the latch slide back to its central position, cam edge 214 disengages disabling lever 216 and hook 210 releases anti-reverse pawl pin 212. Then, releasing dog 232, pivotally supported on the latch slide, engages finger 234 of anti-reverse pawl 102 and momentarily rotates the latter counterclockwise to disengage tooth 106 from the ratchet wheel 88; whereupon spring 92 instantly returns the counter wheel to its initial position defined by the engagement of ratchet wheel ear 94 with stop pin 96. When the adjusting slide reaches its counter reset position, its nose 236 engages and closes normally open switch S12, but before this occurs, the engagement of lobe 238 on releasing dog 232 engages stationary pin 240 and releases the dog 232 from finger 234 so that the counter mechanism is again operative. When the latch slide is later moved again to its midroll rewind position, releasing dog 232 rides past counter lever finger 234 by pivoting in opposition to its light spring 242.

In addition to those switches previously mentioned, the electrical circuit shown in FIG. 1, includes: normally open switch S14, which is closed by the counter lever 78 shortly after cam 74 begins to rotate and which remains closed until the cam completes a single revolution; and normally open switches S16 and S18, which are supported by the camera door and which are held closed by the engagement of their respective shoes 244 and 246 with the upper and lower margins of the filmstrip adjacent the cassette. Also included in the electrical circuit is a double pole double throw relay 248 that is spring-biased to the position show in solid lines by a spring 250 and switchable by a solenoid 252 to the position shown in broken lines, to reverse the polarity of the motor 20 and thereby its rotational direction.

To explain the manner in which the camera functions, it will be assumed first that the camera has just been loaded with a new 36 exposure film cassette, that the adjusting slide and the latch slide are then in their respective central positions, that film has been advanced to the first exposure position and the shutter is cocked in preparation for the first exposure, and that the counter dial has been set to the numeral 36. In this condition, switches S2, S4, S6, S10, S12 and S14 are open and switches S8, S16, and S18 are closed. The motor is thus temporarily de-energized and will run in a film advancing direction when energized because the relay 248 is in the condition shown in solid lines. When the shutter release slide 158 is depressed, the shutter operates as previously described and, after completion of the exposure, the shutter's closing blade 138 closes switch S4, which causes the motor to start running to advance the film. The simultaneous closing of switch S6 by the shutter has no influence on the motor because switch S2, in series with switch S6, is open. As soon as the film starts to advance, it drives sprocket spool 42 and cam 74 in a counterclockwise direction because the lost motion provided between the sprocket spool and the cam by washers 62 has already been absorbed, as will be described later. Accordingly, cam 74 starts to move counter lever 78 in a counterclockwise direction and, simultaneously, to re-cock the shutter by means of cocking lever 166. By the time the re-cocking movement of the shutter blades has caused switch S4 to open, counter lever 78 has engaged and closed switch S14, which now maintains the film advancing energization of the motor. When cam 74 has completed a single revolution, i.e. when the film has been advanced by one frame, nose 76 of the counter lever is returned to its depicted position by spring 80 and thereby opens switch S14. Because switch S4 is now also open due to the cocked condition of the shutter, this opening of switch S14 stops the motor. If desired, means can also be provided to momentarily short circuit the motor in response to the opening of switch S14, to provide dynamic motor braking. Upon completion of the rotation of cam 74, the resulting clockwise movement of the counter lever to its original position incrementally rotates the counter disc so that its arrow 120 is now aligned with the indicium indicating that 35 exposures remain to be made. Each time the shutter button is depressed to initiate an exposure, the foregoing operations are performed automatically to advance the film, recock the shutter and adjust the exposure counter.

Upon completion of the movement of the last available frame into exposure position, the corresponding movement of the counter disk to the "1" position causes brush member 130 to bridge commutator strips 122 and 124 and to close switch S2. Because the shutter has been cocked before the counter dial moves, switch S6, in series with switch S2, is now open, thereby preventing the closing of switch S2 from initiating film rewinding. After the last exposure has been made, the movement of the shutter blades to their depicted positions allows switch S6 to close, whereupon solenoid 252 is energized and switches relay 248 so that the motor now runs in a film rewinding direction. Switch S4 is also now closed by the shutter, but has no influence on the motor because the film advancing circuit in which that switch is incorporated is open whenever the relay is adjusted to its rewind condition by the energization of solenoid 252. The rewinding movement of the film causes sprocket spool 42 to rotate in a clockwise direction until the lost motion provided by washers 62 has been absorbed, whereupon shaft 54 also rotates in a clockwise direction. However, because of the one-way clutch provided by pawl 68 and ratchet wheel 70, cam 74 remains in its depicted position and therefore does not re-cock the shutter or influence the exposure counter mechanism. Accordingly, switch S6 remains closed and the motor continues to run. When the upper leading edge 254 of the filmstrip 12 moves beyond the shoe 244 of switch S16, that switch opens, but this does not effect the motor because the parallel switch S8 remains closed. Upon movement of the lower leading edge 256 of the film tongue 258 beyond the shoe 246 of switch S18, however, the resulting opening of that switch causes the motor to stop. Because shoe 246 is closely adjacent the film cassette, the film tongue protrudes only slightly out of the cassette or is withdrawn into the cassette by the inertia of the motor and the drive mechanism, thus identifying the cassette as having been completely exposed.

The rewinding operation could also be initiated by a device adapted to detect increased motor torque when the film is completely unwound from the supply spool and is drawn taut by the motor, i.e. when all of the predetermined number of exposure frames determined by the length of the filmstrip have been exposed and the motor is unable to complete another film advancing cycle. An example of torque responsive motor reversing means adaptable for this purpose is shown in U.S. Pat. No. 3,946,409.

Opening the cover door to remove the cassette allows spring 110 to move door slide 112 in the direction of the door, whereby the tension of that spring is relieved and the weaker spring 108 pivots anti-reverse pawl 102 in a counterclockwise direction to withdraw tooth 106 from the ratchet wheel. Additionally, the rearward movement of the door slide causes its finger 260 to engage shutter latch lever ear 262 to release the shutter. Before the shutter is thus released however, the movement of slide 112 has caused the latch dog 206 to be released by tooth 208, so that the latch slide has returned to its central position at which its extension 228 is ineffective to block shutter releasing movement of latch lever 146. Because advancing pawl 82 is out of engagement with the ratchet wheel whenever cam 74 is in its depicted position, spring 92 now returns the counter disc to its initial position and thereby opens relay energizing switch S2 so that spring 256 adjusts the relay to its film advancing condition. If the numeral ring were set to a number greater than the maximum number of exposures available, reaching the end of the film might cause the motor to stall rather than being shut off automatically. However, well known means such as a thermal overload sensor or a cycle limiting timer can be provided to avoid damage to the motor or battery if this accident should occur, and the situation can be remedied to rewind the film by manually rotating the numeral ring in a clockwise direction.

After a new cassette is inserted in the camera and the tongue of its film is attached to the take-up spool, closing the camera door closes switches S16 and S18. Because the relay energizing switch S2 is now open and switch S4 is closed by ear 162 of shutter blade 138, the motor now runs to advance the film. Until the lost motion provided by washers 62 is again absorbed, cam 74 remains stationary as the film tongue is wound onto the take-up spool. As the cam starts to rotate, the shutter is cocked and the motor stops upon completion of a single cam revolution, which locates the first available film frame in exposure position. The movement of counter lever 78 at the completion of this rotation of cam 74 advances the counter disc by one increment to the position at which arrow 120 points to the numeral 36. If the cassette now loaded into the camera has a different number of available exposures, the ring is manually adjusted to align the corresponding indicium with the arrow. Alternatively, this adjustment can also be made automatically if the number of available exposures is represented by coding means on the cassette or on the film leader, as is known in the prior art.

Depression of the shutter release slide will now effect exposure of the first film frame, whereupon the camera will automatically advance the film, re-cock the shutter and adjust the counter in the manner previously described.

Assume now that the photographer has made eight exposures on a 36-exposure filmstrip (i.e. the film counter now indicates 28 remaining exposures) and he now desires to use another type of film. To accomplish this, the photographer moves adjusting slide 186 to the mid-roll rewind position, where it is latched by tooth 208 of door slide 112. As previously explained, this movement of the adjusting slide causes switch S8 to open and switch S10 simultaneously to close, and also moves the latch slide to the corresponding position, thereby moving signal flag 222 into visible position in the viewfinder, retracting pawl 82 to an inoperative position, and preventing movement or the ratchet wheel 88 and the shutter latch lever 146. The closing of switch S10 is equivalent to the closing of switch S2 and thereby adjusts relay 248 so that the motor will run in a film rewinding direction. Accordingly, the film is rewound as previously described, but, because switch S8 is now held open by the adjusting slide, the motor stops when switch S16 is opened by the movement of the upper leading filmstrip edge 254 past shoe 244 of that switch, whereby the tongue of the film is left protruding substantially out of the cassette.

Opening the door to install a new cassette now causes door slide tooth 208 to move rearwardly sufficiently to release the adjusting slide and allow it to return to its center position, thereby closing switch S8 and opening switch S10 so that the relay will be adjusted to run the motor in its film advancing direction and switch S16 will be effective eventually to terminate a film rewinding operation. Latch slide 174, however, remains detented in its mid-roll rewind position, in which it displays the viewfinder signal, maintains tooth 106 in engagement with the ratchet wheel 88, disables advancing pawl 82 and blocks release of the shutter. At this point, the photographer has an opportunity to record the remaining number of exposures on the cassette. Then he can momentarily move the adjusting slide to its counter reset position to restore the camera mechanism, as explained below, to the same condition it would be in had the film be rewound automatically. This movement of the adjusting slide to the counter reset position has no influence on the motor even if switch S12 is momentarily closed because of the absence of film in contact with the shoes of switching S16 and S18, which are therefore open.

Preferably, the photographer will already have noted the exposure status of the previous cassette and will have reset the camera mechanism. However, if he has not done so, when a new cassette is installed in the camera and the door is closed, the camera motor rotates the take-up spool in the film winding direction. As previously described, the lost motion between sprocket spool 42 and shaft 54 allows the take-up spool to make several revolutions before cam 74 starts to rotate. When the cam has completed a single rotation, the shutter has been cocked and the first available exposure area is in exposure position. However, this rotation of the cam has no influence on the counter, because advancing pawl 82 remains disabled. Accordingly, the counter still indicates the number of exposures that remained to be made on the previous film cassette and a signal in the viewfinder warns the photographer of this situation. Additionally, because extension 228 of the latch slide is engageable by latch lever 146, depression of the shutter release button is prevented. Having thus been reminded that the previous cassette loaded into the camera was only partially exposed, the photographer has another opportunity to observe the film counter and to note, on the previous cassette or elsewhere, the number of exposures remaining to be made. After having done this, the photographer then moves slide button 192 toward the counter-reset position sufficiently to reset the mechanism, i.e. just far enough to cause the signal flag to disappear from the viewfinder, but not far enough to close switch S12. This adjusting slide movement causes its edge surface 230 to displace the latch slide far enough toward its depicted position, so that latch slide hook 210 is disengaged from the anti-reverse lever 102 and, the tooth 106 is momentarily disengaged from the ratchet wheel 88 by pawl releasing dog 232, as previously explained. This momentary disengagement of tooth 106 from the ratchet wheel allows spring 92 to return indicator disk 114 almost instantly to its initial position, whereupon the photographer adjusts numeral ring 116 so that arrow 120 is pointing to the indicium representing the total number of available film exposures. The movement of the latch slide toward its depicted position also removes the warning flag from the viewfinder and moves the latch slide extension 228 out of blocking alignment with latch lever 146, whereupon the exposure ring can be adjusted and the camera can again be operated automatically in the manner explained previously. The latch slide will be frictionally retained in this position by detent spring 180 until the adjusting slide is subsequently moved all the way to either its mid-roll rewind position or its counter reset position.

When the photographer eventually wishes to reload the partially exposed cassette into the camera, he inserts it into the film supply chamber, attaches its leading end to the take-up spool and then closes the door in the conventional manner. Preferably, either the camera or the film or both are provided with means such as those disclosed in the previously mentioned U.S. Pat. Nos. 4,034,393 and 3,511,153, for insuring that the film sprocket holes initially engage the sprocket spool teeth at the same place as when the film was previously loaded into the camera, whereby the subsequently exposed film frames will be properly spaced relative to the previously exposed ones. Because the latch slide has now allowed switch S8 to close and switch S10 to open, and because the shutter was released by slide 112 as the door was opened, closing the door now initiates rotation of the motor in a film advancing direction. After the film movement absorbs the lost motion between sprocket spool 42 and cam 74, the rotation of the cam re-cocks the shutter and moves the film counter by one increment to its count initiating position, thus preparing the camera for further operation. If the counter is now set at other than the numeral 36, the photographer adjusts the ring so that arrow 120 points to numeral 36, i.e. the number of exposures originally available on the cassette film. Then, in order to advance the film to the next available exposure frame, he moves the slide button all the way to the counter-reset position, causing nose 236 of adjusting slide 180 to close switch S12. As long as this switch remains closed by the adjusting slide, the motor continues to advance the film, which, in turn, continuously rotates cam 74 in a counterclockwise direction. Because the shutter has already been cocked, the rotation of the cam simply oscillates the counter lever 78 and the shutter cocking lever 166, without influencing the shutter, but each rotation of the cam causes an incremental movement of the counter disc as the corresponding film frame is moved past the exposure position without being exposed. When arrow 120 points to numeral 26, the photographer immediately releases slide button 192, which returns to its central position under the influence of spring 198 and opens switch S12 to stop the motor. Accordingly, the camera is now restored to its normal operating condition and will expose the remaining exposure frames in response to successive depressions of the shutter release slide.

From the foregoing it will be seen that the illustrative camera provides the photographer with several opportunities to record the number of exposures made on a partially exposed film roll, facilitates the re-installation of that roll into the camera, and provides fully automatic film cocking, advancing and shutter adjustment.

Although the illustrative preferred embodiment of the invention employs generally conventional mechanical and electro-mechanical elements, and is particularly suitable for relatively inexpensive cameras, it should be understood that the same inventive functions could be performed in a camera controlled by electronic computer means, e.g. a microprocessor and the other electronic components typically associated therewith. For example, the microprocessor camera disclosed in German Offenlegungschrift No. 28 33 550, published on Feb. 15, 1979, could readily be modified to perform in accordance with the present invention. Similarly, it would clearly be obvious to one of ordinary skill in the art to perform these inventive functions by microprocessor and camera means similar to those disclosed in U.S. patent application Ser. No. 166,928, filed in the name of L. J. Matteson on July 7, 1980, entitled IDENTIFYING CASSETTES LOADED IN CAMERAS. Accordingly, it should be understood that the invention has been described in detail with particular reference to a preferred illustrative embodiment thereof, but that variations and modifications can be effected within the spirit and scope of the invention as described hereinabove and as defined in the appended claims.

I claim:

1. In a camera adapted to receive rewindable, cassette loaded film having a leader portion and an image receiving portion, said camera including film advancing means for withdrawing film from the cassette, means for sensing the position of the film relative to the cassette and film rewinding means for rewinding film into the cassette, the improvement comprising:

adjusting means for selectively adjusting said rewinding means to:
 (a) a first condition in which said rewinding means is controlled by said sensing means to rewind the image receiving portion of said film into said cassette and then to automatically terminate its rewinding function to leave at least part of the leader portion of the film extending out of the cassette, and
 (b) a second condition in which said rewinding means is controlled by said sensing means to rewind all of the film, including the leader portion, entirely into the cassette, and then to automatically terminate its rewinding function.

2. In a camera adapted to receive rewindable cassette loaded film, said camera including a shutter and film advancing means for withdrawing film from the cassette and advancing it to bring successive film exposure areas to an exposure position for exposure, film rewinding means, and exposure counter means changable incrementally from an initial condition after each successive film exposure to indicate the exposure status of the film in the camera, the improvement comprising:

selector means for adjusting said film rewinding means selectively to:
 (a) a first condition in which said film is rewound automatically after a predetermined number of exposures have been made and
 (b) to a second condition for rewinding the film in response to such adjustment regardless of the number of exposures that have been made, counter adjusting means having:
 (a) a first mode of operation when said rewinding means adjusted to its first condition for resetting said exposure counter automatically to its initial condition in response to a manipulation of the camera associated with changing film cassettes therein and
 (b) a second mode of operation when said rewinding means is in its second condition for preserving the indicating state of said exposure counter means during film rewinding, and
 (c) resetting means for manually resetting said exposure counter to its initial condition independently of changing film cassettes in said camera.

3. A camera according to claim 2 including shutter disabling means for preventing operation of said shutter whenever said film rewinding means is adjusted to said second condition.

4. A camera according to claim 2 including signal means for indicating the adjustment of said rewinding means to said second condition.

* * * * *